United States Patent Office 3,358,020
Patented Dec. 12, 1967

3,358,020
CATALYTIC PROCESS FOR THE PRODUCTION OF UNSATURATED ALIPHATIC CARBOXYLIC ACIDS
Antonin Hendrickx, Anderlecht-Brussels, Belgium, assignor to UCB (Union Chimique-Chemische Bedrijven) S.A., Brussels, Belgium
No Drawing. Filed Jan. 3, 1964, Ser. No. 335,674
Claims priority, application Great Britain, Jan. 4, 1963, 568/63
8 Claims. (Cl. 260—530)

ABSTRACT OF THE DISCLOSURE

Acrylic acid or a mixture of acrylic acid is prepared by contacting in the vapor phase at 300 to 500° C. a mixture of acrolein and methacrolein, oxygen and water vapor, with a catalyst consisting essentially of iron, molybdenum, vanadium and antimony in chemical combination with oxygen, the antimony to iron atomic ratio being between 1/1 and 10/1, the iron to vanadium atomic ratio being between 1/0.1 and 1/3 and the iron to molybdenum atomic ratio being between 1/0.1 and 1/3.

---

The present invention relates to a catalytic process for the production of unsaturated aliphatic carboxylic acids and in particular for the production of acrylic and methacrylic acids.

It is known to prepare unsaturated aliphatic carboxylic acids by the reaction of the corresponding unsaturated aldehydes with oxygen in the presence of various catalysts, particularly phosphomolybdic acids and their salts, cobalt molybdate, oxygen containing compounds of phosphorus, molybdenum and/or tungsten, combinations of oxides of tin, antimony and possibly of other elements, such as chromium, molybdenum, vanadium and the like.

The present invention relates to a process for the production of unsaturated aliphatic carboxylic acids from the corresponding unsaturated aldehydes and more particularly to the production of acrylic acid from acrolein. This process comprises reacting unsaturated aldehydes in the vapor phase and at an elevated temperature with molecular oxygen or a gas containing molecular oxygen in the presence of water vapor and of catalysts consisting of oxygen containing combinations of iron, molybdenum, vanadium and antimony.

I have found that the catalysts employed in the process of the present invention show not only excellent activity for the oxidation of unsaturated aldehydes to the corresponding unsaturated carboxylic acids, but also very high selectivity in the particular case of the oxidation of acrolein to acrylic acid. Another important characteristic of the process of the present invention is the fact that it enables high yields and conversions to be obtained with very short contact times, i.e. a high productivity.

The catalysts of the present invention must contain the elements iron, molybdenum, vanadium and antimony, in the form of mixtures of oxides and/or of oxygenated combinations. While the exact composition of the catalysts of this invention is not known, the preparation and heat-treatment conditions are such that iron, molybdenum, vanadium and antimony are present in the form of oxides and/or oxygenated combinations of two or more of said elements between them. The catalytic properties are optimum when the Sb/Fe ratio is between 1/1 and 10/1, preferably between 2/1 and 5/1, the Fe/V ratio is between 1/0.1 and 1/3, preferably between 1/0.5 and 1/2, and the Fe/Mo ratio is between 1/0.1 and 1/3, preferably between 1/0.5 and 1/2.

Generally, the aforesaid catalysts are prepared by intimately mixing the oxides of iron, antimony, molybdenum, vanadium and/or starting materials capable of providing the corresponding oxides and/or oxygenated combinations of said elements by a heat-treatment in the presence of oxygen and subjecting the mixture so obtained to a heat-treatment.

According to one preferred embodiment of the invention, the catalysts are prepared from definite compounds of said elements, for example from the corresponding oxides or from salts of definite composition which are capable of giving the corresponding oxides and/or oxygenated combinations of said elements by an appropriate chemical and/or heat-treatment. Examples of said definite compounds are: iron (III) oxide, magnetite, iron trichloride, iron (III) nitrate, antimony (III) oxide, antimony trichloride, vanadium pentoxide, ammonium metavanadate, molybdenum trioxide, ammonium paramolybdate, etc.

According to another embodiment of the invention the catalysts are prepared by intimately mixing in any order the oxides of iron, antimony, molybdenum and vanadium and/or starting materials capable of forming the corresponding oxides and/or oxygenated combinations of said elements by heat-treatment in the presence of oxygen, while taking the ratios hereinbefore defined into account, then subjecting the mixture so obtained to an additional activating heat-treatment.

According to a third embodiment, two of the said oxides and/or starting materials, for example an iron compound and an antimony compound are first mixed together, this mixture is then subjected to an activating heat-treatment, the two other oxides and/or starting materials, for example a molybdenum salt and a vanadium salt, are then added to the mixture, and the mixture so obtained is again subjected to an activating heat-treatment.

The activating heat-treatment of the catalysts employed according to this invention comprises a heating operation performed at a temperature between about 400 and 950° C., preferably between about 450 and 850° C., in the presence of air, for a period of time which may vary between 1 and 240 hours, preferably between 2 and 150 hours. This heat-treatment may also be performed in several stages, i.e. at least two of the compounds used in the preparation of the catalysts are first subjected to said activating heat-treatment, then the other two compounds are added thereto and the mixture so obtained is again subjected to said activating heat-treatment.

Generally, the catalysts employed according to the invention may be used as such. However, it is also possible to deposit the catalysts on a conventional carrier such as alumina, silica, pumice, and the like.

The catalysts used according to this invention have a particle size which varies according to the catalytic method used. Thus, in fixed bed catalysis the catalyst particles may have a size between about 1 and 10 mm., whereas in fluidized or moving bed catalysis the particle size may be from about 25 to about 500 microns.

Generally speaking, the present invention is applicable to the oxidation of unsaturated aliphatic aldehydes to the corresponding unsaturated aliphatic acids and more particularly to the conversion of acrolein and methacrolein respectively to acrylic acid and a mixture of acrylic and methacrylic acid. There may be used also as starting materials those gaseous mixtures resulting from the vapor-phase oxidation of one or more olefinic hydrocarbons, such as propylene.

In the process according to the invention, aldehydes are treated either with oxygen or with mixtures of oxygen with inert gases such as air. Other diluents may also be used, for example carbon oxides, saturated hydrocarbons, and so on. As explained hereinbefore, there may be used a gaseous mixture resulting from the oxidation of propylene and containing acrolein, propylene, propane, oxygen, nitrogen, water vapor, carbon oxides and a minor amount of other oxygenated organic compounds.

The molecular oxygen-aldehyde ratio is generally between about 0.1 and 2. Water vapor is simultaneously used in more important quantities, i.e. about 1 to 20 mols per mol aldehyde used. It has been found that water vapor reduces the formation of completely oxidized compounds.

The reaction temperature is generally between about 200 and 600° C., the best results being obtained when the temperature is between 300 and 500° C.

The process is usually carried out at atmospheric pressure or at a pressure close thereto.

The contact time between the reaction mixture and the catalyst, which is dependent among other factors on the reaction temperature, varies between 0.1 and 20 seconds, preferably between 0.2 and 10 seconds.

The oxidation of the unsaturated aldehydes is preferably carried out in the presence of a fixed bed of catalyst; nevertheless, it is also possible to apply a fluidized bed or a moving bed of catalyst according to known techniques.

The oxidation of certain unsaturated aldehydes executed with the aid of the catalysts of the invention is very specific and is scarcely accompanied by unimportant secondary reactions. This is the case for example in the conversion of acrolein to acrylic acid.

Unlike other catalysts, the catalysts of the present invention do not require periodic regeneration by means of oxygenated gases, which is one of the advantages of said catalysts.

The recovery of the unsaturated aliphatic carboxylic acids formed in the course of the reaction is carried out by conventional methods, for example by condensation or by absorption in water, by neutralization with inorganic bases or by any recovery method known per se.

The following examples illustrate the process of the present invention, more particularly the preparation of acrylic acid from acrolein and of acrylic and methacrylic acid from methacrolein; it is obvious that these examples do not in any way limit the scope and spirit of the invention.

For the analysis of the acids formed, the total acidity of the aqueous solution obtained from the recovery of the acids, is determined by titration. The qualitative and quantitative determination of the carboxylic acids formed is effected by gas chromatography starting from the aforesaid aqueous solution.

In the particular case of the oxidation of acrolein, a substantially complete conversion of the latter is readily obtained when operating at a temperature in the range of 325–350° C. in the presence of the catalysts employed according to the invention and water vapor, with a contact time of about 0.5 to 1 second.

Amongst other advantages of this method, mention should be made of the fact that the recovery of the unconverted acrolein or its possible recycling, becomes unnecessary because conversions of practically 100% are easily obtained when using the present catalysts. Amongst the carboxylic acids collected, acrylic acid is preponderant and only small quantities of acetic acid are formed. These catalysts are very selective; more than 80% of the acrolein used can be converted into acrylic acid, as illustrated hereinafter in the examples.

By conversion of unsaturated aldehyde there is to be understood the percentage of the latter which is converted in the course of the reaction; by acid efficiency is to be understood the percentage of unsaturated aldehyde which is converted into carboxylic acids; and by yield of carboxylic acids is to be understood the product of 100 times the quotient of the acid efficiency by the conversion.

EXAMPLE 1.—PREPARATION OF CATALYSTS 1

*Catalyst 1A*

A solution containing 50 ml. of 4 N hydrochloric acid, 68.4 g. of antimony trichloride and 16.2 g. of ferric chloride is introduced gradually, with vigorous agitation, into 125 ml. of ammonia (d. 0.91), to which 300 ml. of water has been added. The solid product obtained is filtered on a Büchner funnel and taken up three times in boiling water.

The mass is dried for 24 hours at 100° C. and crushed. It is then subjected to the following heat-treatment in the presence of air: 16 hours at 650° C., 16 hours at 750° C. and 24 hours at 850° C. A portion of the mass is crushed and screened to give 1 to 1.6 mm. diameter granules (Catalyst 1). Fe/Sb ratio=1/3.

Another portion is finely ground to a particle size of about 50 microns and the resulting pulverulent mass is treated in three different ways to prepare the Catalysts 1B, 1C and 1D.

*Catalyst 1B*

10.32 g. of said pulverulent mass are impregnated with a solution of 7.06 g. of ammonium paramolybdate in 110 ml. of water. The mass is evaporated to dryness at 100° C. and calcined in the presence of air at 450° C. for 16 hours. The mass is crushed and sieved to give 1 to 1.6 mm. diameter granules. Fe/Mo/Sb ratio=1/2/3.

*Catalyst 1C*

The procedure of Catalyst 1B is followed but the pulverulent mass is impregnated with a solution of 2.34 g. of ammonium metavanadate in 30 ml. of water. Fe/V/Sb ratio=1/1/3.

*Catalyst 1D*

This is a catalyst according to this invention.

10.32 g. of the pulverulent mass prepared above are impregnated with a solution of 7.06 g. of ammonium paramolybdate in 110 ml. of water and a solution of 2.34 g. of ammonium metavanadate in 30 ml. of water. The mass is evaporated to dryness at 100° C. and calcined in the presence of air at 450° C. for 16 hours. It is crushed and the granules of 1 to 1.6 mm. diameter are collected. Fe/Mo/V/Sb ratio=1/2/1/3.

EXAMPLE 2.—PREPARATION OF CATALYST 2

172 g. of ferric nitrate nonahydrate ($Fe(NO_3)_3 9H_2O$) are dissolved in their water of crystallization and 123.9 g. of antimony trioxide are gradually added thereto. The resulting mass is heated, with stirring, until a dry powder is obtained. This powder is brought to 400° C. in a muffle furnace until evolution of nitrous vapors ceases. It is transferred to a ball mill and 34.1 g. of antimony trioxide, 9.4 g. of ferric oxide ($Fe_2O_3$) and 4 g. of graphite are added thereto. The mixture is homogenized for some hours and then compressed into 3 mm. diameter pellets which are subjected to a gradual heat-treatment in the presence of air, for 48 hours at 500° C., for 24 hours at 650° C., for 24 hours at 750° C. and for 24 hours at 850° C. They are then reduced to a fine powder and impregnated with aqueous solutions of molybdenum and vanadium salts in the manner described in Example 1 for obtaining Catalyst 1D. Fe/Mo/V/Sb ratio=1/1.4/0.7/2.

EXAMPLE 3

In order to determine the catalytic activity, the catalyst is placed in a 6 mm. bore tubular reactor, heated in a conventional manner. A gaseous mixture containing 4.8% by volume of acrolein, 4.8% by volume of oxygen, 67.8% by volume of nitrogen and 22.6% by volume of water vapor is passed through the reactor.

In the following table, the yields (R%) and the efficiencies (E%) are given in total acids and the distribution into acetic and acrylic acid ($C_2/C_3$) is calculated based on 100% of total acids. In the column "t.° C." is given the temperature, expressed in degrees centigrade, at which the reaction is carried out; in the column "c. t. sec.," the contact time, expressed in seconds, and in the column "C%" is given the conversion of acrolein, expressed in percent.

| Catalyst | t.° C. | c. t. sec. | C% | R% | E% | $C_2/C_3$ |
|---|---|---|---|---|---|---|
| 1A | 350 | 1 | 13 | 31 | 4 | 7/93 |
| 1B | 350 | 1.5 | 34 | 80 | 27 | 7/93 |
| 1C | 350 | 1 | 32 | 30 | 9 | 17.5/82.5 |
| 1D | 325 | 1.5 | 74 | 74 | 54 | 10/90 |
| 1D | 350 | 1.5 | 88 | 69 | 61 | 8/92 |
| 2 | 325 | 0.5 | 96 | 90 | 86 | 6/94 |
| 2 | 325 | 1 | 100 | 81 | 81 | 9/91 |
| 2 | 350 | 1 | 100 | 70 | 70 | 7/93 |
| 2 | 350 | 0.5 | 98 | 90 | 88 | 6/94 |

EXAMPLE 4

The catalyst No. 2 is placed in a 6 mm. bore tubular reactor, heated in a conventional manner. A gaseous mixture containing 5% by volume of methacrolein, 5% by volume of oxygen, 67% by volume of nitrogen and 23% by volume of water vapor is passed through the reactor.

At 375° C., with a contact time of 0.5 second, the conversion is 63%; the efficiencies of acetic acid, acrylic acid and methacrylic acid amount to 14%, 9.5% and 10.5%, respectively, which correspond to a $C_2/C_3/C_4$ ratio=41/28/31

I claim:
1. A process for the production of unsaturated aliphatic acid selected from the group consisting of acrylic acid and a mixture of acrylic acid with methacrylic acid, which comprises contacting in the vapor phase at a temperature between 300 and 500° C. a mixture of a corresponding unsaturated aldehyde selected from the group consisting of acrolein and methacrolein, oxygen and water vapor, with a catalyst consisting essentially of iron, molybdenum, vanadium and antimony in chemical combination with oxygen, the antimony to iron atomic ratio being between 1/1 and 10/1, the iron to vanadium atomic ratio being between 1/0.1 and 1/3 and the iron to molybdenum atomic ratio being between 1/0.1 and 1/3.

2. A process according to claim 1 for producing acrylic acid, wherein the unsaturated aliphatic aldehyde is acrolein.

3. A process according to claim 1 for producing a mixture of acrylic acid and methacrylic acid, wherein the unsaturated aliphatic aldehyde is methacrolein.

4. A process according to claim 1, wherein the catalyst is supported.

5. A process according to claim 1, wherein the oxidation is carried out with air.

6. A process according to claim 1, wherein the molar ratio of aldehyde to oxygen is in the range of about 0.1 to about 2.

7. A process according to claim 1, wherein 1 to 20 mols of water vapor are used per mol aldehyde.

8. A process according to claim 1, wherein the catalyst has a Sb/Fe atomic artio of 2/1 to 5/1, a Fe/V atomic ratio of 1/0.5 to 1/2 and a Fe/Mo atomic ratio of 1/0.5 to 1/2.

References Cited

FOREIGN PATENTS 903,034   8/1962   Great Britain.

LORRAINE A. WEINBERGER, *Primary Examiner.*

V. GARNER, *Assistant Examiner.*